US012810201B2

(12) United States Patent
Tobiyama et al.

(10) Patent No.: US 12,810,201 B2
(45) Date of Patent: Nov. 24, 2026

(54) DISCRIMINATOR GENERATION DEVICE, DISCRIMINATOR GENERATION METHOD, AND DISCRIMINATOR GENERATION PROGRAM FOR PERFORMING APPLICATION-LEVEL TRAFFIC IDENTIFICATION IN A LARGE SCALE NETWORK

(71) Applicant: NTT, Inc.

(72) Inventors: Shun Tobiyama, Tokyo (JP); Kazunori Kamiya, Tokyo (JP); Bo Hu, Tokyo (JP)

(73) Assignee: NTT, Inc., Tokyo (JP)

( * ) Notice: Subject to any disclaimer, the term of this patent is extended or adjusted under 35 U.S.C. 154(b) by 747 days.

(21) Appl. No.: 18/038,956

(22) PCT Filed: Dec. 1, 2020

(86) PCT No.: PCT/JP2020/044677
§ 371 (c)(1),
(2) Date: May 25, 2023

(87) PCT Pub. No.: WO2022/118373
PCT Pub. Date: Jun. 9, 2022

(65) Prior Publication Data
US 2023/0419173 A1 Dec. 28, 2023

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| | | | | |
|---|---|---|---|---|
| 8,311,956 B2 * | 11/2012 | Sen | | G06N 20/20 706/12 |
| 8,509,075 B2 * | 8/2013 | Eswaran | | H04L 45/306 370/252 |

(Continued)

FOREIGN PATENT DOCUMENTS

| | | |
|---|---|---|
| JP | 2020181265 A | 11/2020 |
| WO | 2020079986 A1 | 4/2020 |

OTHER PUBLICATIONS

Karagiannis et al. (2005) "BLINC: Multilevel Traffic Classification in the Dark," SIGCOMM'05, Aug. 21-26, 2005, Philadelphia, Pennsylvania [online] [Retrieved on Nov. 17, 2020], Internet<URL:https://www.researchgate.net/publication/221164762_BLINC_Multilevel_Traffic_Classification_in_the_Dark>.

(Continued)

*Primary Examiner* — Maikhanh Nguyen

(57) ABSTRACT

An identifier generation device includes identifier generation circuitry configured to acquire flow data of an application, calculate first feature vectors from the flow data, convert the first feature vectors into second feature vectors to which feature vectors of an identical type of application are similar, cluster the second feature vectors and add a pseudo-label to the clustered second feature vectors, generate a learning data set from the second feature vectors to which the pseudo-label is added, supply the learning data set to an identifier, and update a setting of the identifier to which the learning data set is supplied.

8 Claims, 5 Drawing Sheets

(56) References Cited

U.S. PATENT DOCUMENTS

| | | | | |
|---|---|---|---|---|
| 10,999,146 | B1 * | 5/2021 | Savalle | H04L 41/0893 |
| 11,025,486 | B2 * | 6/2021 | Savalle | G06F 18/214 |
| 11,349,716 | B2 * | 5/2022 | Vasseur | H04L 63/1408 |
| 11,451,456 | B2 * | 9/2022 | Tedaldi | G06N 3/0895 |
| 11,570,070 | B2 * | 1/2023 | Sivaraman | G06N 20/20 |
| 11,811,659 | B2 * | 11/2023 | Tobiyama | H04L 63/0245 |
| 2008/0232275 | A1 * | 9/2008 | Eswaran | H04L 45/48 370/256 |
| 2018/0096261 | A1 * | 4/2018 | Chu | G06N 20/20 |
| 2018/0375773 | A1 * | 12/2018 | Gobriel | H04L 45/7459 |
| 2019/0065586 | A1 * | 2/2019 | Yoshikawa | G06F 16/35 |
| 2020/0127892 | A1 * | 4/2020 | Savalle | H04L 41/0894 |
| 2021/0365788 | A1 * | 11/2021 | Lee | G06N 3/09 |

OTHER PUBLICATIONS

Chen et al. (2017) "Seq2Img: A Sequence-to-Image based Approach Towards IP Traffic Classification using Convolutional Neural Networks," IEEE International Conference on Big Data (BIGDATA) [online] [Retrieved on Nov. 17, 2020], Internet<https://ieeexplore.ieee.org/document/8258054>.

Hsu et al. (2019) "Unsupervised Learning via Meta-Learning," Published as a conference paper at ICLR 2019, [online] [Retrieved on Nov. 17, 2020], Internet<https://openreview.net/forum?id=r1My6sR9tX>.

Tsukatani et al. (2019) "Active learning based on self-supervised feature learning" IEICE Technical Report, Aug. 28, 2019, vol. 119, No. 193, pp. 115-119.

* cited by examiner

DISCRIMINATOR GENERATION DEVICE, DISCRIMINATOR GENERATION METHOD, AND DISCRIMINATOR GENERATION PROGRAM FOR PERFORMING APPLICATION-LEVEL TRAFFIC IDENTIFICATION IN A LARGE SCALE NETWORK

CROSS-REFERENCE TO RELATED APPLICATIONS

This application is a U.S. National Stage Application filed under 35 U.S.C. § 371 claiming priority to International Patent Application No. PCT/JP2020/044677, filed on 1 Dec. 2020, the disclosure of which is hereby incorporated herein by reference in its entirety.

TECHNICAL FIELD

The present invention relates to an identifier Generation device, an identifier generation method, and an identifier generation program.

BACKGROUND ART

In the related art, schemes of identifying applications that have generated traffic are known. As such a scheme, there is a scheme of extracting features from packet data which is a type of traffic data, or flow data in which statistical information of the packet data is recorded and identifying applications based on a predetermined rule (see, for example, Non Patent Literature 1). There is a scheme of performing application identification by learning and classifying features for each application using a machine learning technology (see, for example, Non Patent Literature 2).

CITATION LIST

Non Patent Literature

Non Patent Literature 1: BLINC: Multilevel Traffic Classification in the Dark, [online] [Retrieved on Nov. 17, 2020], Internet <URL:https://www.researchgate.net/publication/221164762_BLI NC_Multilevel_Traffic_Classification_in-_the_Dark>

Non Patent Literature 2: Seq2Img: A Sequence-to-Image based Approach Towards IP Traffic Classification using Convolutional Neural Networks, [online] [Retrieved on Nov. 17, 2020], Internet <https://ieeexplore.ieee.org/document/8258054>

Non Patent Literature 3: Unsupervised Learning via Meta-Learning, [online] [Retrieved on Nov. 17, 2020], Internet <https://openreview.net/forumnd=r1My6sR9tX>

SUMMARY OF INVENTION

Technical Problem

However, in the related art, application-level traffic identification cannot be quickly performed in a large-scale network. This is because the schemes of the related art cannot handle new types of applications and there is a problem chat it is difficult co prepare a large amount of training data necessary for learning.

For example, while new applications emerge every day, rule-based technologies cannot identify such newly emerging applications. In the technology using supervised machine learning, it is necessary to prepare a large amount of training data in advance. However, since flow data includes only simple information such as internet protocol (IP) addresses and port numbers, it is difficult to add application-level labels, and accuracy is also low. Therefore, there is a need for a technique capable of identifying a target application even when there is a small amount of training data of an application to be identified.

Solution to Problem

In order to solve the above-described problems and achieve the object, an identifier generation device according to the present invention includes: identifier generation circuitry configured to: acquire flow data of an application; calculate first feature vectors from the flow data; convert the first feature vectors into second feature vectors to which feature vectors of an identical type of application are similar; cluster the second feature vectors and add a pseudo-label to the clustered second feature vectors; generate a learning data set from the second feature vectors to which the pseudo-label is added; supply the learning data set to an identifier; and update a setting of the identifier to which the learning data set is supplied.

An identifier generation method according to the present invention is an identifier generation method executed by an identifier generation device. The method includes: acquiring flow data of an application; calculating first feature vectors from the flow data; converting the first feature vectors into second feature vectors to which feature vectors of an identical type of application are similar; clustering the second feature vectors and adding a pseudo-label to the clustered second feature vectors; generating a learning data set from the second feature vectors to which the pseudo-label is added; supplying the learning data set to an identifier; and updating a setting of the identifier to which the learning data set is supplied.

A non-transitory computer-readable recording medium storing therein an identifier generation program according to the present invention causes a computer to execute a process including: acquiring flow data of an application; calculating first feature vectors from the flow data; converting the first feature vectors into second feature vectors to which feature vectors of an identical type of application are similar; clustering the second feature vectors and adding a pseudo-label to the clustered second feature vectors; generating a learning data set from the second feature vectors to which the pseudo-label is added; supplying the learning data set to an identifier; and updating a setting of the identifier to which the learning data set is supplied.

Advantageous Effects of Invention

According to the present invention, it is possible to quickly perform application-level traffic identification in a large-scale network.

DESCRIPTION OF EMBODIMENTS

Hereinafter, embodiments of an identifier generation device, an identifier generation method, and an identifier generation program according to the present invention will be described in detail with reference to the drawings. The present invention is not limited to the embodiments to be described below.

First Embodiment

Hereinafter, a configuration of the identifier generation device, the use example of the identifier generation device, and the flow of an identifier generation process according to the present embodiment will be described in order. Finally, the advantageous effects of the present embodiment will be described.

Configuration of Identifier Generation Device

Figure 1:
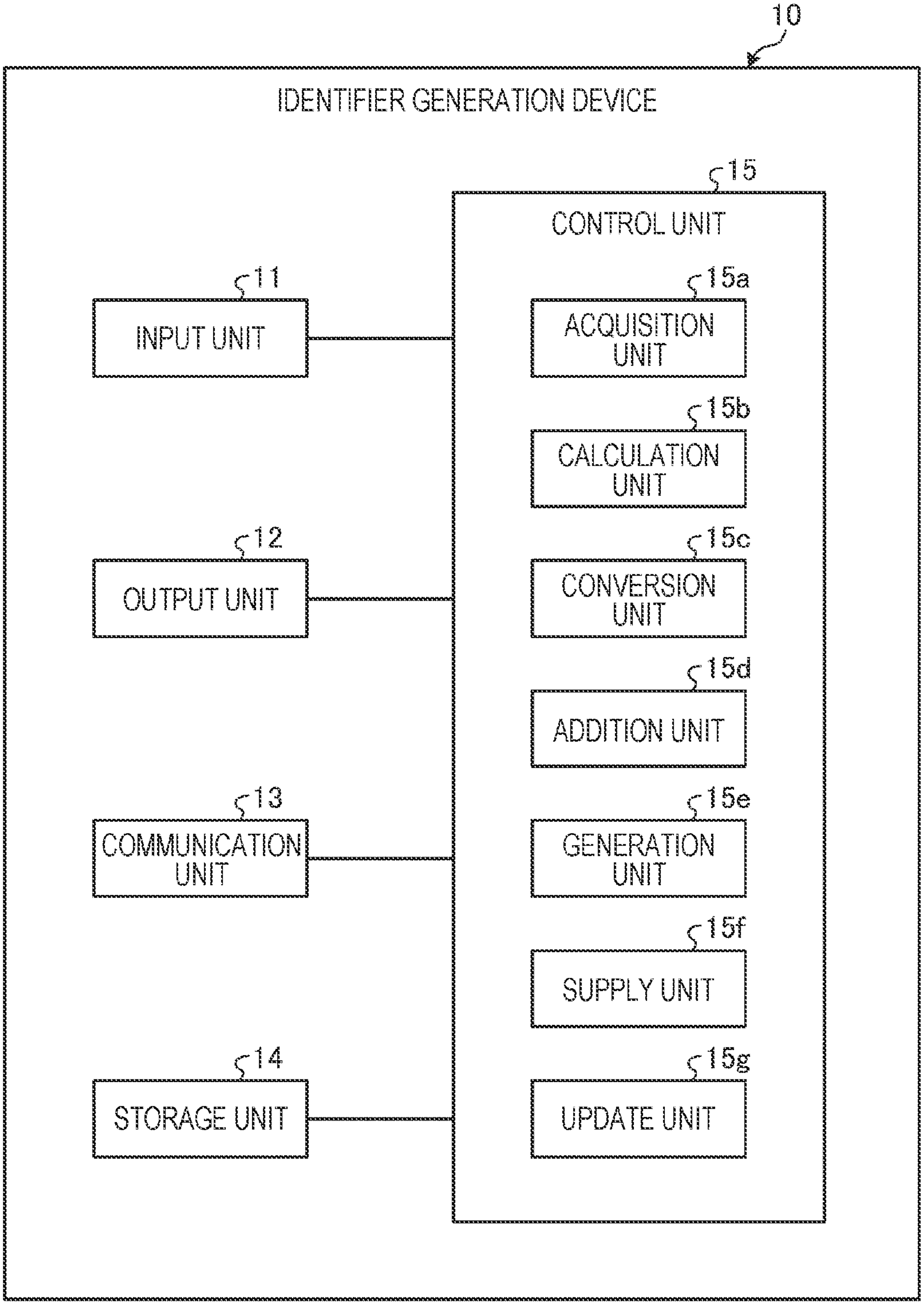
FIG. 1 is a block diagram illustrating a configuration era le of an identifier generation device according to a first embodiment.

A configuration of the identifier generation device according to the present embodiment will be described in detail with reference to FIG. 1. FIG. 1 is a block diagram illustrating a configuration example of an identifier generation device according to the present embodiment. The identifier generation device 10 includes an input unit 11, an output unit 12, a communication unit 13, a storage unit 14, and a control unit 15.

The input unit 11 is responsible for inputting various kinds of information to the identifier generation device 10. The input unit 11 is, for example, a mouse, a keyboard, or the like and receives an input of setting information or the like to the identifier generation device 10. The output unit 12 is also responsible for controlling an output of various kinds of information from the identifier generation device 10. The output unit 12 is, for example, a display or the like and outputs setting information or the like stored in the identifier generation device 10.

The communication unit 13 is responsible for managing data communication with other devices. For example, the communication unit 13 performs data communication with each communication device. The communication unit 13 can perform data communication with a terminal of an operator (not illustrated).

The storage unit 14 stores various kinds of information referred to when the control unit 15 operates, and stores various types of information acquired when the control unit 15 operates. Here, the storage unit 14 is, for example, a semiconductor memory element such as a random access memory (RAM) or a flash memory, a storage device such as a hard disk or an optical disc, or the like. In the example of FIG. 1, the storage unit 14 is installed inside the identifier generation device 10, but may be installed outside of the identifier generation device 10, or a plurality of storage units may be installed.

The control unit 15 controls the entire identifier generation device 10. The control unit 15 includes an acquisition unit 15*a*, a calculation unit 15*b*, a conversion unit 15*c*, an addition unit 15*d*, a generation unit 15*e*, a supply unit 15*f*, and an update unit 15*g*. Here, the control unit 15 is, for example, an electronic circuit such as a central processing unit (CPU) or a micro processing unit (MPU), or an integrated circuit such as an application specific integrated circuit (ASIC) or a field programmable Gate array (FPGA).

The acquisition unit 15*a* acquires flow data of the application. For example, the acquisition unit 15*a* acquires flow data for each Internet Protocol (IP) address. Here, the flow data of the application is information including the number of packets and the number of bytes of the data in addition to an IP address, a port number, and the like of a transmission source or a transmission destination of data of the application, but is not Particularly limited. The acquisition unit 15*a* acquires the flow data for each IP address per predetermined time. For example, the acquisition unit 15*a* acquires flow data having a specific IP address per 24 hours as a transmission source or a transmission destination.

The calculation unit 15*b* calculates a first feature vector from the flow data acquired by the acquisition unit For example, the calculation unit 15*b* calculates a statistical first feature vector for each IP address. The calculation unit 15*b* calculates at least one of histograms of the number of packets, the number of bytes, and the number of bytes per packet as the first feature vector. Here, the first feature vector is information including one or a plurality of feature amounts such as the number of packets and the number of bytes included in the flow data of the application, but the present invention is not particularly limited thereto.

The conversion unit 15*c* converts the first feature vector calculated by the calculation unit 15*b* into a second feature vector to which a feature vector of an identical type of application is similar. For example, the conversion unit 15*c* converts the first feature vector into a second feature vector mapped to a predetermined latent space. Here, the second feature vector is information converted such that feature vectors of the identical type of application are similar to each other by mapping the statistically processed first feature vectors to a latent space suitable for unsupervised clustering, but the present invention is not particularly limited thereto.

The addition unit 15*d* clusters the second feature vectors converted by the conversion unit 15*c* and adds a pseudo-label to the clustered second feature vectors. For example, the addition unit 15*d* performs unsupervised clustering on the second feature vectors. The addition unit 15*d* performs unsupervised clustering on the second feature vector a plurality of times by a predetermined scheme. For example, the addition unit 15*d* performs clustering using the K-means method as an unsupervised clustering scheme and adds a pseudo-label. The addition unit 15*d* may generate a plurality of different clusters using one or a plurality of unsupervised clustering schemes and add a pseudo-label to each cluster.

The generation unit 15*e* generates a learning data set from the second feature vectors to which the pseudo-label is added by the addition unit 15*d*. For example, the generation unit 15*e* randomly extracts the second feature vectors to which the pseudo-label added and generates a learning data set including a predetermined number of pieces of learning data. Here, the learning data set is a data set including about one to twenty pieces of learning data, but the present invention is not particularly limited thereto. The generation unit 15*e* generates a plurality of learning data sets so that the supply unit 15*f* to be described below can supply a learning data set a plurality of times or repeatedly, but the present invention is not Particularly limited thereto.

The supply unit 15*f* supplies the learning data set generated by the generation unit 15*e* to the identifier. Here, the supply unit 15*f* may supply different learning data sets or repeatedly supply the same learning data set.

The update snit 15*g* updates a setting of the identifier to which the learning data set is supplied by the supply unit 15*f*. For example, the update unit 15*g* updates the setting of an initial parameter or a learning method based on information regarding a parameter of the identifier and identification accuracy of test data before and after the learning data set is supplied.

The update unit 15*g* updates the initial parameter of the identifier and the learning method based on the information regarding a change in the parameter before and after learning and a change in the identification accuracy when the identifier is learned in each data set so that high identification accuracy can be achieved in any learning result in any data set. At this time, the update unit 15*g* can cause the identifier to learn "the initial parameter and the learning method of the identifier suitable for a case where only a small amount of data is given" by providing a data set that has a small amount of learning data and performing meta-learning. Therefore, the update unit 15*g* uses a data set that has a small number of pieces of learning data, which is generated in a large amount by the generation unit 15*e*, in the meta-learning process.

As described above, the identifier generation device 10 according to the present embodiment converts the feature vectors into feature vectors to which feature vectors of the identical type of application are similar by mapping the feature vectors calculated from the flow data to the latent space suitable for unsupervised clustering, clusters the converted feature vector and adds the pseudo-label, generates a learning data set from the feature vectors to which the pseudo-label is added, causes the identifier to learn from the generated learning data set, and performs meta-learning to learn the learning method of the identifier from the learning data set, information of the identifier before and after learning, and the like.

Therefore, the number of pieces of necessary training data is reduced by applying the meta-learning technology, and a newly emerging application can be quickly identified. By mapping the feature vectors extracted from flow data with no label to the latent space suitable for unsupervised clustering and then performing clustering, it is possible to generate a more accurate pseudo-label and enhance the effect of meta-learning of the identifier. Further, it is possible to utilize flow data of a large-scale network in which it is difficult to prepare a large amount of training data, and it is possible to identify traffic at an application level even in the large-scale network.

Use Example of Identifier Generation Device

Figure 2:
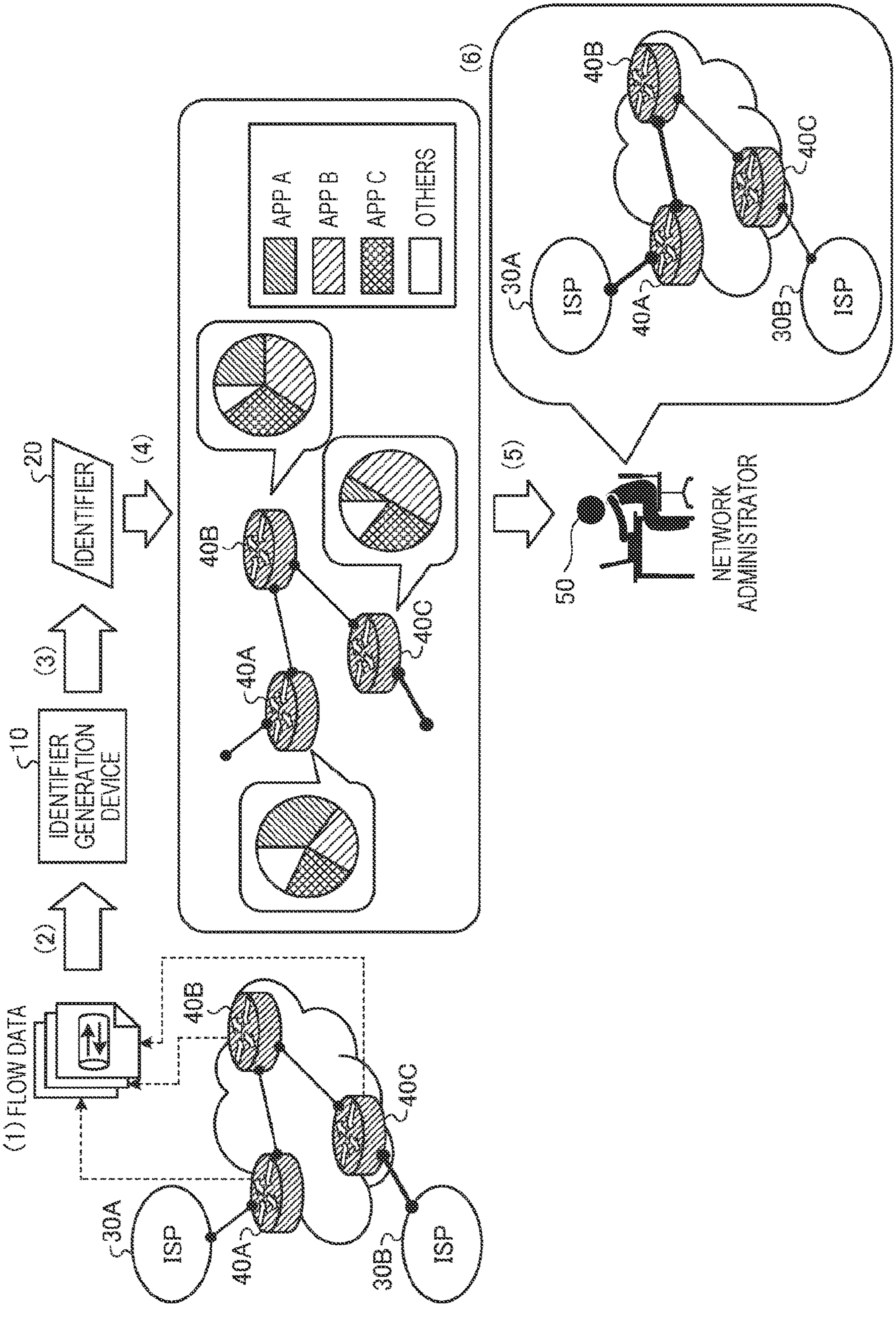
FIG. 2 is a diagram illustrating a use example of the identifier generation device according to the first embodiment.
Figure 3:
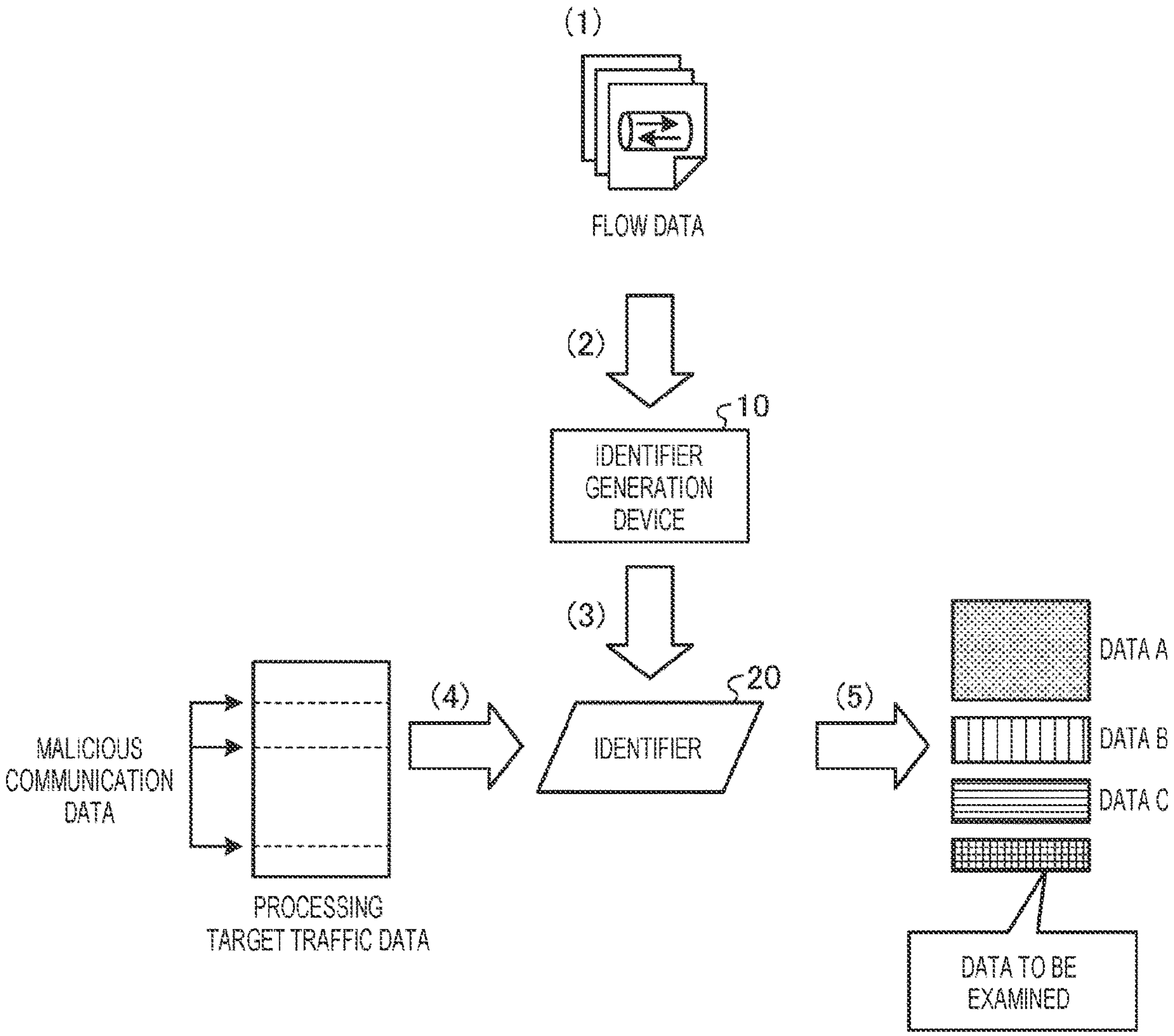
FIG. 3 is a diagram illustrating a use example of the identifier generation device according to the first embodiment.

A use example of the identifier generation device according to the present embodiment will be described with reference to FIGS. 2 and 3. FIGS. 2 and 3 are diagrams illustrating use examples or the identifier generation device according to the first embodiment.

Use Example 1

Firstly, a use example in which traffic of an Internet Services Provider (ISP) network is visualized and efficiency of network monitoring and network equipment investment planning are improved will be described with reference to FIG. 2. The identifier generation device 10 first collects the flow data from the network devices 40 (40A, 40B, and 40C) connected to the ISPs 30 (30A and 30B) on the network (see (1) in FIG. 2) and acquires the flow data (see (2) in FIG. 2).

Next, the identifier generation device 10 generates a learning data set based on the flow data, supplies the learning data set to the identifier 20, and updates the setting of the identifier 20 (see (3) of FIG. 2). Subsequently, the identifier 20 analyzes the flow data obtained from the network device 40, identifies applications involved in the network device 40, and calculates a proportion of each application in the processing data for each network device (see (4) in FIG. 2).

In FIG. 2, "App A", "App B", "App C", and "others" are illustrated as the applications involved in the network device 40, and a use proportion of the applications is illustrated in a pie graph form for each of the network devices 40A to 40C.

A network administrator 50 monitors and analyzes the use ratio of the application indicated for each network device (see (5) in FIG. 2). The network administrator 50 can ascertain a detailed network situation from the use ratio of the application and the like and improve the ISP network.

For example, in the ISP network before improvement, a line between the ISP 30B and the network device 40C is set so that a large amount of traffic flows. On the other hand, the identifier 20 ascertains that the use ratio of "App A" that has large consumption of network resources is high in the network devices 40A and 40B, and the use ratio of "App B" that has small consumption of network resources is high in the network device 40C. At this time, the network administrator 50 can change the setting so that the line of the ISP 30A is enhanced to cause a large amount of traffic to flow to the network devices 40A and 40B (see (6) in FIG. 2).

In Use Example 1, in the ISP network, the identifier 20 is generated from the collected network flow data using the identifier generation device 10. Therefore, by using the generated identifier 20 for identification and visualization, a detailed network situation can be ascertained. Thus, it is useful to ascertain a route to be intensively invested.

Use Example 2

Secondly, a use example related to screening for malicious communication detection will be described with reference to FIG. 3. The identifier Generation device 10 first collects the flow data on the network (see (1) of FIG. 3) and acquires the flow data (see (2) of FIG. 3). Next, the identifier generation device 10 generates a learning data set based on the flow data, supplies the learning data set to the identifier 20, and updates the setting of the identifier 20 (see (3) of FIG. 3).

Subsequently, the identifier 20 analyzes traffic data including malicious communication (see (4) of FIG. 3), and excludes data related to a normal application or the like from processing target traffic data (see (5) of FIG. 3). In FIG. 3, the identifier 20 can exclude "data A", "data B", and "data C" as data related to the normal application or the like and screen the remaining data as data to be examined.

In the foregoing Use Example 2, when malicious communication including a very small amount is detected from large-scale traffic data, the identifier 20 is generated using the identifier generation device 10. Therefore, when the generated identifier 20 is used, it is possible to reduce the amount of traffic data to be examined by excluding normal traffic in advance. Thus, it is possible to reduce a burden on the malicious communication detection.

Flow of Identifier Generation Process

Figure 4:
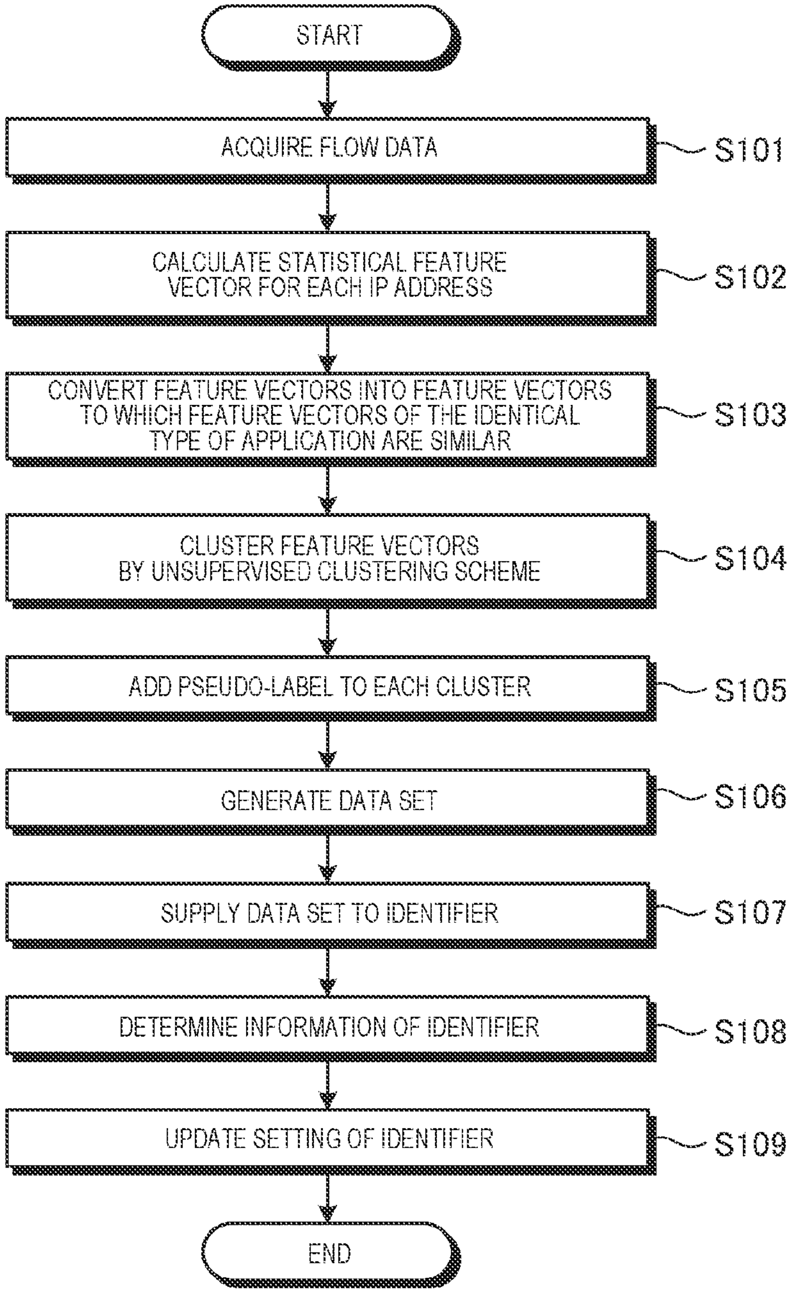
FIG. 4 is a flowchart illustrating an example of a flow of an identifier generation process according to the first embodiment.

A flow of the identifier generation process according to the present embodiment will be described in detail with reference to FIG. 4. FIG. 4 is a flowchart illustrating an example of a flow of the identifier generation process according to the first embodiment. The acquisition unit 15*a* of the identifier generation device 10 first acquires the flow data on the network (step S101).

Next, the calculation unit 15*b* calculates the feature vectors (the first feature vectors) using a statistical feature amount of information such as the number of bytes and the number of packets for each IP address of the flow data (step S102). Subsequently, the conversion unit 15*c* converts the feature vectors into the feature vectors (the second feature vectors) to which feature vectors of the identical type of application are similar by mapping the feature vectors calculated by the calculation unit 15*b* to the latent space suitable for unsupervised clustering, (step S103).

Then, the addition unit 15*d* generates the clusters by clustering the converted feature vectors by an unsupervised clustering scheme such as the K-means method (step S104). At this time, the addition unit 15*d* generates the plurality of clusters to generate various learning data sets by performing the clustering a plurality of times. The addition unit 15*d* may generate a plurality of different clusters using a plurality of unsupervised clustering schemes. The addition unit 15*d* may generate a plurality of different clusters by performing the clustering after some of the feature vectors are converted using one unsupervised clustering scheme. A clustering scheme performed by the addition unit 15*d* is not particularly limited. The addition unit 15*d* adds the pseudo-label to each of the generated clusters (step S105).

Further, the generation unit 15*e* randomly extracts data from the feature vectors to which the pseudo-label is added and generates a data set including a small amount of learning data (step S106). Here, the data set including a small amount of learning data is a data set including about one to twenty pieces of learning data, but the present invention is not particularly limited thereto. The generation unit 15*e* can statically or dynamically change the number of samples of the learning data included in the data set.

Thereafter, the supply unit 15*f* supplies a data set to the identifier for which identification of an application is desired to be learned (step S107). Finally, the update unit 15*g* determines information such as parameters and identification accuracy of the identifier before and after the supply (step S108) and updates the parameters of the identifier and the learning method based on the result so that high accuracy is achieved even at the small amount of learning data (step S109). Then, the process ends.

At this time, the supply unit 15*f* may repeat the process of step S107 so that the data set is supplied for a certain time or a certain number of times. The supply unit may perform the process of step S107 again after the process of step S106 or may perform the process of step S107 again after the process of step S109. Further, the update unit 15*g* may repeat the process of steps S108 and S109 until a certain time elapses or until the identifier desired to be learned reaches certain identification accuracy.

Advantageous Effects of First Embodiment

Firstly, in the identifier generation process according to the present embodiment described above, the flow data of the application is acquired, the first feature vectors are calculated from the acquired flow data, the calculated first feature vectors are converted into the second feature vectors to which the feature vectors of the identical type of application are similar, the converted second feature vectors are clustered, the pseudo-label is added to the clustered second feature vectors, the learning data set is generated from the second feature vectors to which the pseudo-label is added, the generated learning data set is supplied to the identifier, and the setting of the identifier to which the learning data set is supplied is updated. Therefore, through this process, it is possible to quickly perform application-level traffic identification in a large-scale network.

Secondly, in the identifier generation process according to the present embodiment described above, the flow data for each IP address is acquired, the statistical first feature vectors for each IP address are calculated, the first feature vectors are converted into the second feature vectors mapped to the predetermined latent space, and the converted second feature vectors are subjected to the unsupervised clustering. Therefore, through this process, the flow data can be utilized without preparing a large amount of training data in a large-scale network, and the application-level traffic identification can be quickly performed.

Thirdly, in the identifier generation process according to the present embodiment described above, the flow data for each IP address per predetermined time is acquired, and at least one of the histograms of the number of packets, the number of bytes, and the number of bytes per packet is calculated as the first feature vector. Therefore, through this process, the flow data can be utilized without preparing a large amount of training data in a large-scale network, and application-level traffic identification can be more effectively performed.

Fourthly, in the identifier generation process according to the present embodiment described above, the second feature vectors are subjected to unsupervised clustering a plurality of times by a predetermined method. Therefore, through this process, more various learning data sets can be generated in the large-scale network, and application-level traffic identification can be more effectively performed.

Fifthly, in the identifier generation process according to the present embodiment described above, the second feature vectors to which the pseudo-label is added are randomly extracted, and the learning data set including the predetermined number of pieces of learning data is generated. Therefore, through the present process, it is possible to generate an identifier that performs correct identification from a smaller amount of learning data in a large-scale network, and it is possible to perform application-level traffic identification more quickly.

Sixthly, in the identifier generation process according to the present embodiment described above, the setting of the initial parameter or the learning method is updated based on the information regarding the parameter of the identifier and the identification accuracy of the test data before and after the learning data set is supplied. Therefore, through this process, it is possible to generate the identifier that performs correct identification from a smaller amount of learning data in a large-scale network, and it is possible to perform application-level traffic identification more effectively.

System Configuration and the Like

Each constituent of each device that has been illustrated according to the foregoing embodiment is functionally conceptual, and does not necessarily have to be physically configured as illustrated. That is, a specific form of distribution and integration of individual devices is not limited to the illustrated form, and all or some of the configurations can be functionally or physically distributed and integrated in any unit according to various loads, use situations, and the like. Furthermore, all or some of the processing functions performed in each device can be implemented by a CPU and a program analyzed and executed by the CPU, or can be implemented as hardware by wired logic.

Of the individual processes described in the foregoing embodiment, all or some of the processes described as being automatically performed can be manually performed. Alternatively, all or some of the processes described as being manually performed can be automatically performed by a known method. In addition, the processing procedure, the control procedure, the specific name, and information including various types of data and parameters illustrated in the above literatures or the drawings can be arbitrarily changed unless otherwise mentioned.

Program

It is also possible to create a program in which the process executed by the identifier generation device 10 described in the foregoing embodiment is described in a language that can be executed by a computer. In this case, by causing the computer to execute the program, it is possible to obtain the advantageous effects similar to those of the foregoing embodiment can be obtained. Further, the process similar to that of the foregoing embodiment may be realized by recording the program on a computer-readable recording medium and reading and executing the program recorded in the recording medium on the computer.

Figure 5:
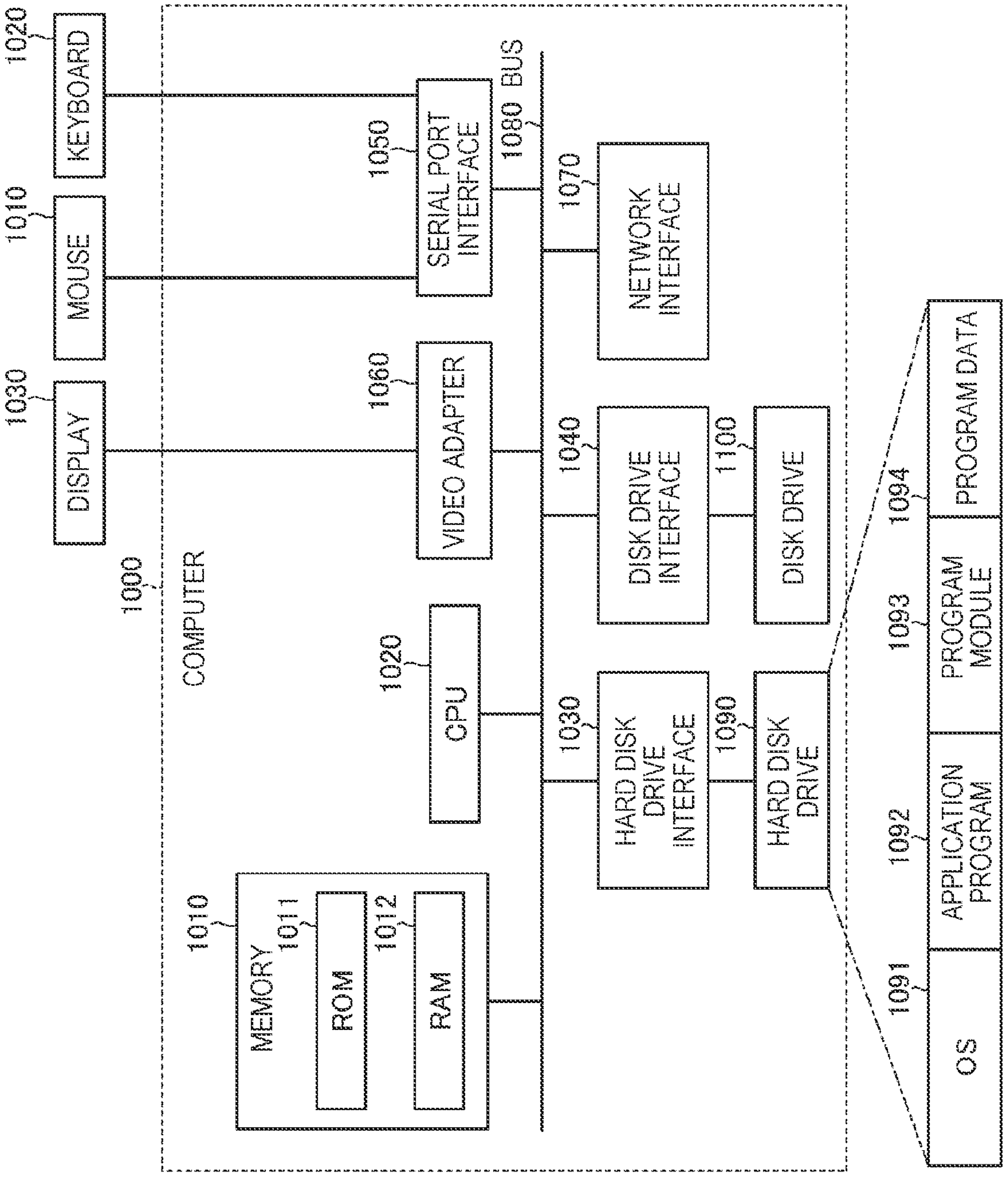
FIG. 5 is a diagram illustrating a computer that executes a program.

FIG. 5 is a diagram illustrating a computer that executes a program. As illustrated in FIG. 5, a computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

As exemplified in FIG. 5, the memory 1010 includes a read only memory (ROM) 1011 and a RAM 1012. The RCM 1011 stores, for example, a booting program such as a basic input output system (BIOS). The hard disk drive interface 1030 is connected to a hard disk drive 1090 as exemplified in FIG. 5. The disk drive interface 1040 is connected to a disk drive 1100 as exemplified in FIG. 5. For example, a removable storage medium such as a magnetic disk or an optical disk is inserted into the disk drive 1100. As exemplified in FIG. 5, the serial port interface 1050 is connected to, for example, a mouse 1110 and a keyboard 1120. As exemplified in FIG. 5, the video adapter 1060 is connected to, for example, a display 1130.

Here, as exemplified in FIG. 5, the hard disk drive 1090 stores, for example, an OS 1091, an application program 1092, a program module 1093, and program data 1094. That is, the foregoing program is stored, for example, in the hard disk drive 1090 as a program module in which a command executed by the computer 1000 is described, Various kinds of data described in the foregoing embodiment are stored as program data in, for example, the memory 1010 and the hard disk drive 1090. Then, the CPU 1020 reads out the program module 1093 and the program data 1094 stored in the memory 1010 and the hard disk drive 1090 to the RAM 1012 as necessary, and executes various processing procedures.

The program module 1093 and the program data 1094 related to the program are not limited to being stored in the hard disk drive 1090, and may be stored in, for example, a removable storage medium, and read by the CPU 1020 via a disk drive or the like. Alternatively, the program module 1093 and the program data 1094 related to the program may be stored in another computer connected via a network (such as local area network (LAN) or a wide area network (WAN)) and read by the CPU 1020 via the network interface 1070.

The foregoing embodiments and modifications of the embodiments are included in the invention described In the claims and the equivalent scope thereof, similarly to being included in the technology disclosed in the present specification.

REFERENCE SIGNS LIST

10 Identifier generation device
11 Input unit
12 Output unit
13 Communication unit
14 Storage unit
15 Control unit
15*a* Acquisition unit
15*b* Calculation unit
15*c* Conversion Unit
15*d* Addition unit
15*e* Generation unit
15*f* Supply unit
15*g* Update unit
20 Identifier
30A, 30B ISP
40A, 40B, 40C Network device
50 Network administrator

The invention claimed is:

1. An identifier generation device comprising:
identifier generation circuitry configured to:
acquire flow data of an application;
calculate first feature vectors from the flow data;
convert the first feature vectors into second feature vectors to which feature vectors of an identical type of application are similar;
cluster the second feature vectors and add a pseudo-label to the clustered second feature vectors;
generate a learning data set from the second feature vectors to which the pseudo-label is added, the learning data set including learning data no more than a predetermined amount;
supply the learning data set to an identifier; and
update a setting of the identifier to which the learning data set is supplied, and generate the identifier through meta-learning using the learning data set including the learning data no more than the predetermined amount.

2. The identifier generation device according to claim 1, wherein the identifier generation circuitry configured to:
acquire the flow data for each Internet Protocol (IP) address;
calculate the statistical first feature vector for each IP address;
convert the first feature vectors into the second feature vectors mapped to a predetermined latent space; and
perform unsupervised clustering on the second feature vectors.

3. The identifier generation device according to claim 2, wherein the identifier generation circuitry configured to:
acquire the flow data for each of the IP addresses per predetermined time; and
calculate, as the first feature vector, at least one of histograms of the number of packets, the number of bytes, and the number of bytes per packet.

4. The identifier generation device according to claim 2, wherein the identifier generation circuitry configured to perform unsupervised clustering of the second feature vector a plurality of times by a predetermined scheme.

5. The identifier generation device according to claim 2, wherein the identifier generation circuitry configured to randomly extract the second feature vector to which the pseudo-label is added, and generate the learning data set including a predetermined number of pieces of learning data.

6. The identifier generation device according to claim 1, wherein the identifier generation circuitry configured to update a setting of an initial parameter or a learning method based on information regarding a parameter of the identifier and identification accuracy of test data before and after the learning data set is supplied.

7. An identifier generation method executed by an identifier generation device, the method comprising:

acquiring flow data of an application;

calculating first feature vectors from the flow data;

converting the first feature vectors into second feature vectors to which feature vectors of an identical type of application are similar;

clustering the second feature vectors and adding a pseudo-label to the clustered second feature vectors;

generating a learning data set from the second feature vectors to which the pseudo-label is added, the learning data set including learning data no more than a predetermined amount;

supplying the learning data set to an identifier; and updating a setting of the identifier to which the learning data set is supplied, and generate the identifier through meta-learning using the learning data set including the learning data no more than the predetermined amount.

8. A non-transitory computer-readable recording medium storing therein an identifier generation program causing a computer to execute a process comprising:

acquiring flow data of an application;

calculating first feature vectors from the flow data;

converting the first feature vectors into second feature vectors to which feature vectors of an identical type of application are similar;

clustering the second feature vectors and adding a pseudo-label to the clustered second feature vectors;

generating a learning data set from the second feature vectors to which the pseudo-label is added, the learning data set including learning data no more than a predetermined amount;

supplying the learning data set to an identifier; and updating a setting of the identifier to which the learning data set is supplied, and generate the identifier through meta-learning using the learning data set including the learning data no more than the predetermined amount.

* * * * *